(12) United States Patent
Meyer et al.

(10) Patent No.: US 8,818,913 B1
(45) Date of Patent: Aug. 26, 2014

(54) WIRELESS ACCESS USING PREEXISTING DATA CONNECTION

(75) Inventors: Steven C. Meyer, Huntington Beach, CA (US); R. Lynn Livingston, Orange, CA (US); William W. Junkin, Corona del Mar, CA (US)

(73) Assignee: Junkin Holdings LLC, Corona del Mar, CA (US)

( * ) Notice: Subject to any disclaimer, the term of this patent is extended or adjusted under 35 U.S.C. 154(b) by 1639 days.

(21) Appl. No.: 10/756,261

(22) Filed: Jan. 14, 2004

(51) Int. Cl.
G06Q 30/00 (2012.01)
G06F 15/16 (2006.01)
G06Q 10/00 (2012.01)

(52) U.S. Cl.
USPC .............................. 705/347; 705/1.1; 709/227

(58) Field of Classification Search
USPC ................................. 705/1, 1.1, 347; 709/227
See application file for complete search history.

(56) References Cited

U.S. PATENT DOCUMENTS

| | | | |
|---|---|---|---|
| 5,684,450 A | 11/1997 | Brown | |
| 5,774,869 A | 6/1998 | Toader | |
| 5,907,547 A * | 5/1999 | Foladare et al. | 370/352 |
| 5,929,750 A | 7/1999 | Brown | |
| 5,933,071 A | 8/1999 | Brown | |
| 6,008,739 A | 12/1999 | Hymel | |
| 6,009,410 A * | 12/1999 | LeMole et al. | 705/14 |
| 6,144,292 A | 11/2000 | Brown | |
| 6,172,597 B1 | 1/2001 | Brown | |
| 6,282,405 B1 | 8/2001 | Brown | |
| 6,327,570 B1 | 12/2001 | Stevens | |
| 6,335,968 B1 | 1/2002 | Malik | |
| 6,459,683 B2 * | 10/2002 | Busuioc et al. | 370/270 |
| 6,463,468 B1 * | 10/2002 | Buch et al. | 709/219 |
| 6,549,683 B1 * | 4/2003 | Bergeron et al. | 382/298 |
| 6,601,039 B1 | 7/2003 | Kolls | |
| 6,714,975 B1 * | 3/2004 | Aggarwal et al. | 709/224 |
| 7,263,362 B1 * | 8/2007 | Young et al. | 455/450 |
| 7,369,841 B1 * | 5/2008 | Uhlik et al. | 455/406 |
| 2002/0007313 A1 | 1/2002 | Mai et al. | |
| 2002/0010775 A1 * | 1/2002 | Rakavy et al. | 709/224 |
| 2002/0022483 A1 | 2/2002 | Thompson et al. | |
| 2002/0023002 A1 * | 2/2002 | Staehelin | 705/14 |
| 2002/0023003 A1 | 2/2002 | Raheman | |
| 2002/0041663 A1 | 4/2002 | Malik | |
| 2002/0087335 A1 * | 7/2002 | Meyers et al. | 705/1 |
| 2002/0138737 A1 | 9/2002 | Schulz | |
| 2002/0141385 A1 | 10/2002 | Wasik et al. | |
| 2002/0165780 A1 | 11/2002 | Terranova | |

(Continued)

OTHER PUBLICATIONS

Toshiba Hotspot Security Technical Whitepaper [online], [retrieved on Mar. 10, 2004]. Retrieved from the Internet:<URL:http://cdgenp01.csd.toshiba.com/content/pr/download/Hotspot%20Security_4.pdf>, 7 pages.

(Continued)

*Primary Examiner* — Candice D Wilson
(74) *Attorney, Agent, or Firm* — McDermott Will & Emery LLP

(57) ABSTRACT

Wireless data access is provided for customers using a preexisting merchant data connection. An access point is used to communicate wirelessly with customer-owned or merchant-provided computing devices. The preexisting data communication link includes merchant-generated traffic, such as credit card authorization transactions or corporate electronic mail. A router is configured to combine customer-generated wireless traffic with the merchant-generated traffic and to transport the combined data over the preexisting data communication link. Further features, such as protocol conversion, are also provided.

26 Claims, 4 Drawing Sheets

(56) References Cited

U.S. PATENT DOCUMENTS

| | | | |
|---|---|---|---|
| 2002/0174235 A1 | 11/2002 | Likourezos | |
| 2002/0174335 A1* | 11/2002 | Zhang et al. | 713/168 |
| 2002/0191622 A1* | 12/2002 | Zdan | 370/401 |
| 2003/0040969 A1 | 2/2003 | O'Hagan et al. | |
| 2003/0046168 A1 | 3/2003 | Muller | |
| 2003/0050041 A1 | 3/2003 | Wu | |
| 2003/0122864 A1* | 7/2003 | Jenne et al. | 345/738 |
| 2003/0125011 A1 | 7/2003 | Campbell | |
| 2003/0140256 A1 | 7/2003 | Hauenstein et al. | |
| 2003/0163369 A1* | 8/2003 | Arr | 705/14 |
| 2005/0027543 A1* | 2/2005 | Labrou et al. | 705/1 |
| 2005/0086346 A1* | 4/2005 | Meyer | 709/229 |

OTHER PUBLICATIONS

Toshiba product information for WRC-1000HS [online], [retrieved on Mar. 4, 2004]. Retrieved from the Internet<URL:http://csd.toshiba.com>, 5 pages.

* cited by examiner

WIRELESS ACCESS USING PREEXISTING DATA CONNECTION

TECHNICAL FIELD

The present disclosure relates generally to wireless data communications, and more-particularly, to provisioning wireless access using existing data communication channels.

BACKGROUND

Consumers are adopting wireless local area network (WLAN) technologies rapidly. A variety of WLAN technologies have emerged to provide high data rate wireless network links (also known as Wi-Fi) that can be used to provide data connectivity for mobile computing. Typical consumer uses for WLANs include connecting to the Internet for browsing websites, for sending and receiving electronic mail, and for telephony applications.

As consumer demand grows for "always-on" Internet connectivity for mobile devices, conventional service providers, such as cellular telephony providers, are increasingly deploying networks of hotspots or places where a consumer can go to access the service provider's network and thereby connect to the Internet or other networked resources. Typically hotspots are located in places where consumers or travelers spend time, such as retail stores, restaurants, hotels, and airports. The service providers supply their own wide area connectivity for their customer's use.

One problem with conventional hotspot networks, however, is that many such networks are deployed. These networks largely lack interoperability from the consumer perspective. Although the underlying technology is the same or similar, customers of a first hotspot network typically cannot access the Internet or other resources on a second hotspot network. The hotspot networks generally charge a subscription fee for network access and only provide network services to their own subscribers.

Owners of the businesses where hotspots are located typically allow the service providers to install one or more WLAN access points to provide Wi-Fi connectivity to their customers. Although the plurality of hotspot networks may cause some consumer confusion and dissatisfaction, merchants generally recognize that hotspots have the potential to bring in additional business, which increases revenues without additional expenses.

Some merchants, however, may prefer to purchase their own wireless access points in order to control how wireless access is provided to their customers. One drawback to this approach is that the merchant typically needs to obtain additional data communication services from an Internet service provider to transport the customer's Wi-Fi data to the Internet. Although the merchant may be able to charge a fee for access, high speed or broadband data communication services can be expensive.

What is needed is a system and method for providing wireless access over a wide area data connection that is pre-existing in the merchant's place of business. What is further needed is a system and method for controlling access to and generating revenue from the wireless access provided.

SUMMARY OF THE DISCLOSURE

In one aspect, wireless data access is provided for customers using a preexisting merchant data connection. An access point is used to communicate wirelessly with customer-owned or merchant-provided computing devices. The preexisting data communication link includes merchant-generated traffic, such as credit card authorization transactions or corporate electronic mail. A router is configured to combine customer-generated wireless traffic with the merchant-generated traffic and to transport the combined data to a network, such as the Internet, over the preexisting data communication link.

In another aspect, a wireless access point is configured to communicate customer-generated traffic and a business network is configured to communicate merchant-generated traffic. A router is configured to couple the wireless access point and the business network to a data communication link having a data transport capacity. The router includes a quality of service module for assigning priorities to the data packets. Priorities may be used to control the quantity or data throughput of the customer- or merchant-generated traffic. Because the data transport capacity or bandwidth is limited, the quality of service module can be used to ensure that customer-generated traffic does not prevent merchant-generated traffic, such as credit card authorization transactions, from reaching the network in a timely manner.

In a further aspect, the router includes a protocol conversion module. The protocol conversion module can convert or marshal inbound traffic into a format suitable for transmission on the network. For example, the merchant-generated traffic and the customer-generated traffic may be in different packet-based or circuit-switched formats. The protocol conversion module may buffer the inbound traffic and package the outbound traffic appropriately for the network.

Further features of the present disclosure, its nature and various advantages will be more apparent from the accompanying drawings and the following detailed description.

BRIEF DESCRIPTION OF THE DRAWINGS

The accompanying drawings illustrate several embodiments of the disclosure and, together with the description, serve to explain the principles of the present disclosure.

DETAILED DESCRIPTION OF THE EMBODIMENTS

The present disclosure is now described more fully with reference to the accompanying figures, in which several embodiments are shown. The present disclosure may be embodied in many different forms and should not be construed as limited to the embodiments set forth herein. Rather these embodiments are provided so that this disclosure will be thorough and complete and will fully convey the invention to those skilled in the art.

A. System Overview

Figure 1:
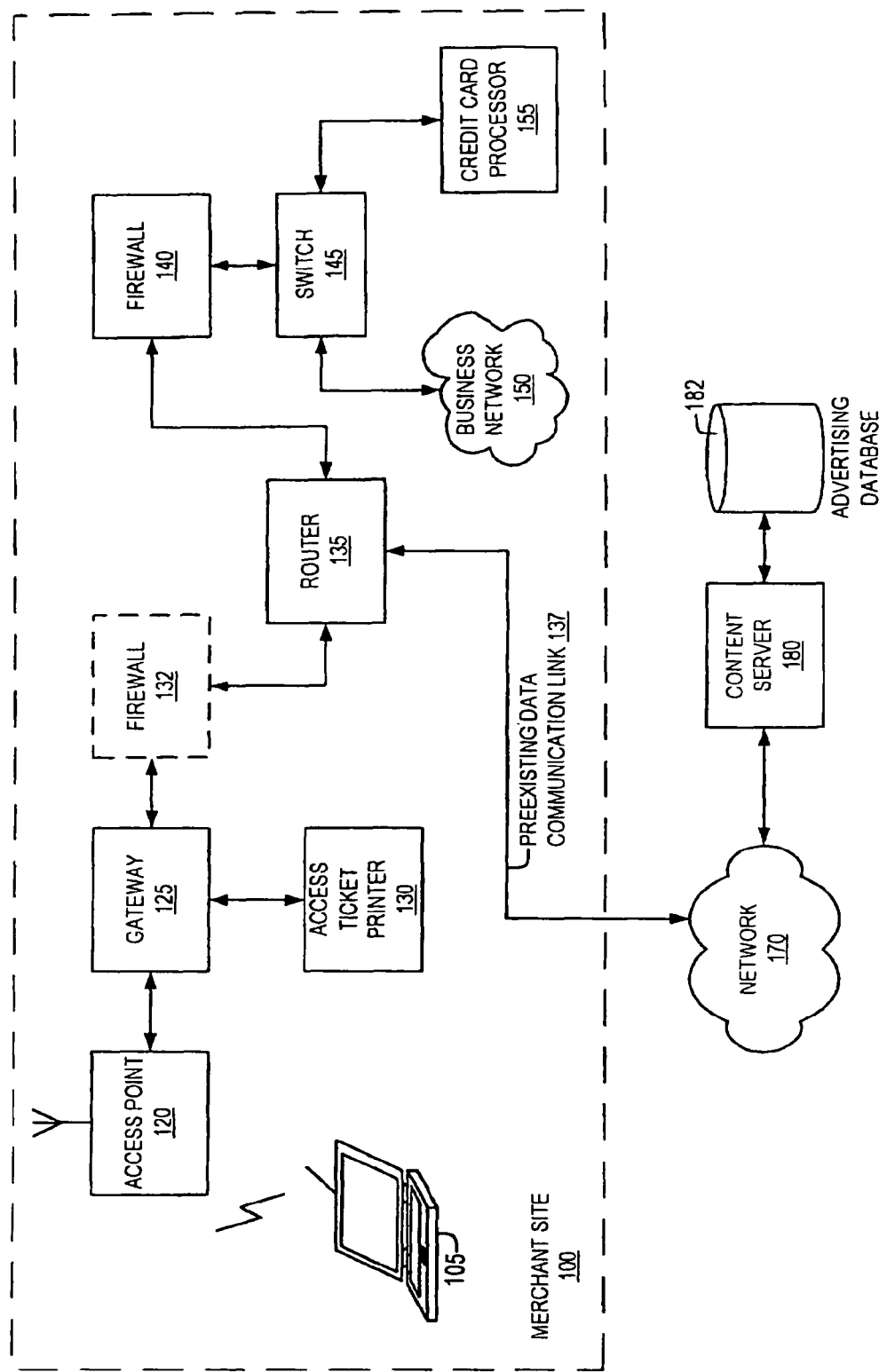
FIG. 1 is a diagram illustrating an overall system configuration according to an embodiment of the present disclosure.

In an embodiment of the present disclosure, a place of business or merchant site provides wireless Internet access for its customers. Merchants generally have preexisting data communication links that are used for business communications, such as corporate electronic mail or processing customer credit card transactions with a clearinghouse. In an embodiment, a merchant can implement a radio access network or wireless data interface for customer use on the preexisting data communication link. This advantageously provides customers with wireless Internet access while not requiring the use of additional, expense data links to an Internet service provider. The radio interfaces may use any suitable wireless data transmission technology, such as local area Ethernet protocols (e.g., IEEE 802.11), Bluetooth, and infrared. FIG. 1 is a diagram illustrating an overall system configuration according to an embodiment of the present disclosure. The illustrated embodiment includes a merchant site 100, a network 170, a content server 180, and an advertising database 182. The merchant site 100 includes a computing device 105, an access point 120, a gateway 125, an access ticket printer 130, a first firewall 132, a router 135, a second firewall 140, a switch 145, a business network 150, and a credit card processor 155.

The computing device 105 may be a conventional customer-owned laptop computer, cellular radiotelephone, personal digital assistant, or a standalone kiosk or workstation that is provided by the merchant. The computing device 105 includes a wireless interface that associates with the access point 120 when the computing device 105 is located within the range of the access point 120 (e.g., inside of and near the merchant site 100).

The access point 120 sends and receives customer-generated traffic over a wireless interface (e.g., radio frequency or infrared signals) and bridges the wireless interface to the coupled gateway 125. The gateway 125 provides a wireline interface for the access point 120. One skilled in the art will appreciate that the gateway 120 can function as an access concentrator for a plurality of access points, although singularly illustrated in the illustrated embodiment.

The gateway 125 may also provide access control features to control the customer's use of the wireless network. The gateway 125 can interface with an access ticket printer 130, which can be used to generate or to display information that the customer needs to access the wireless network. Example information includes a randomly-generated login credential (e.g., a password) and an encryption key (e.g., a Wi-Fi protected access (WPA) key). The gateway 125 may also interface with the merchant's point-of-sale system to enable the merchant to more easily sell wireless access. In one embodiment, the merchant can bundle a predetermined amount of wireless access with other products or services. The predetermined amount may be based on several criteria, for example: the dollar amount or unit amount of the purchase, the time of day, and a given amount of time in minutes, hours, or days.

The gateway 125 also provides a portal web page or other user interface. The portal web page may provide customer-specific information, such as wireless access time remaining or advertisements. When the customer initiates a communications session, the portal web page may display a login screen. If access control features are enabled, the customer can then enter information from the access ticket to gain access to the wireless network. Additional detail on the display of advertisements is described below.

In the illustrated embodiment, an optional first firewall 132 is shown. The gateway 125 is coupled to and communicates with the first firewall 132. The first firewall 132 is coupled to the router 135. The first firewall 132 may be used to protect the wireless access users from intrusions from the network 170. For example, packet inspection, traffic analysis, or network address translation features may be used to safeguard the computing device 105 from an attacker on the network 170. Although the first firewall 132 may be used to enhance system security, one skilled in the art will appreciate that the gateway 125 may also be directly coupled to the router 135.

The first firewall 132 may also be used to restrict customer-generated or outbound data from accessing the network 170. In one embodiment, the first firewall 132 can prevent the computing device 105 from accessing the network 170 without receiving data from the network 170 in the portal user interface described below and with reference to FIG. 4. That is, the user of the computing device 105 may be required to view user content (e.g., Internet web pages) surrounded in whole or in part by advertising or other messages. The user content and advertisements may be blended into a single display page or user interface.

The router 135 is coupled to the network 170 via the preexisting data communication link 137. The preexisting data communication link 137 is preexisting in the sense that it was originally deployed for corporate communication purposes, such as electronic mail or processing customer transactions with a credit card clearinghouse. The router 135 may include protocol conversion capabilities that are needed to interface the access point 120 with the network 170. The router 135 is described in further detail below and with reference to FIG. 2.

The router 135 is also coupled to the second firewall 140. The second firewall 140 protects the corporate portion of the network from the customer-generated traffic. That is, merchant-generated traffic passes through the second firewall 140, but customer-generated traffic is blocked. This protects the merchant's corporate infrastructure from intrusion from customers or other unauthorized users.

The second firewall 140 is coupled to the switch 145. The switch 145 may be used to connect a plurality of system entities to the merchant's network. In the illustrated embodiment, the business network 150 represents a plurality of computing devices or network entities that are part of the corporate infrastructure. The business network 150 may be a local or wide area network that transports data using a suitable protocol.

The credit card processor 155 is also coupled to the switch 145. The credit card processor 155 is used to request authorization for customer credit card transactions from a service provider or clearinghouse. More specifically, the credit card processor 155 communicates with the clearinghouse by using the preexisting data communication link 137 that is coupled to the network 170.

The network 170 may be a wide area circuit-switched or packet-based network, such as the Internet. In one embodiment, the network 170 transports data using Internet protocol packets. Elements of the business network 150 or the credit card processor 155 may communicate with the switch 145 or the router 135 in different protocol (e.g., Systems Network Architecture (SNA)). For example, the credit card processor 155 may use synchronous data link control (SDLC) to communicate with the router 135. The router 135, therefore, converts or marshals the data into Internet protocol format packets for transport on the network 170.

The content server 180 is a conventional network server that is coupled to the network 180. The content server 180 may be operated by the merchant or another entity. The content server 180 may be located in any suitable location including the merchant site 100. The content server 180 is coupled to an advertising database 182. The advertising database 182 includes a plurality of advertisements that can be displayed on the computing device 105. The display format of the advertisements can be adjusted depending on the type of computing device 105. For example, a laptop computer may have more screen area than a cellular radiotelephone or personal digital assistant.

In one embodiment, the gateway 125 requests advertising content from the content server 180. The gateway 125 may monitor the domain name system (DNS) requests or other data that is present in the customer-generated traffic to present the customer with content-sensitive advertisements.

B. Router

Figure 2:
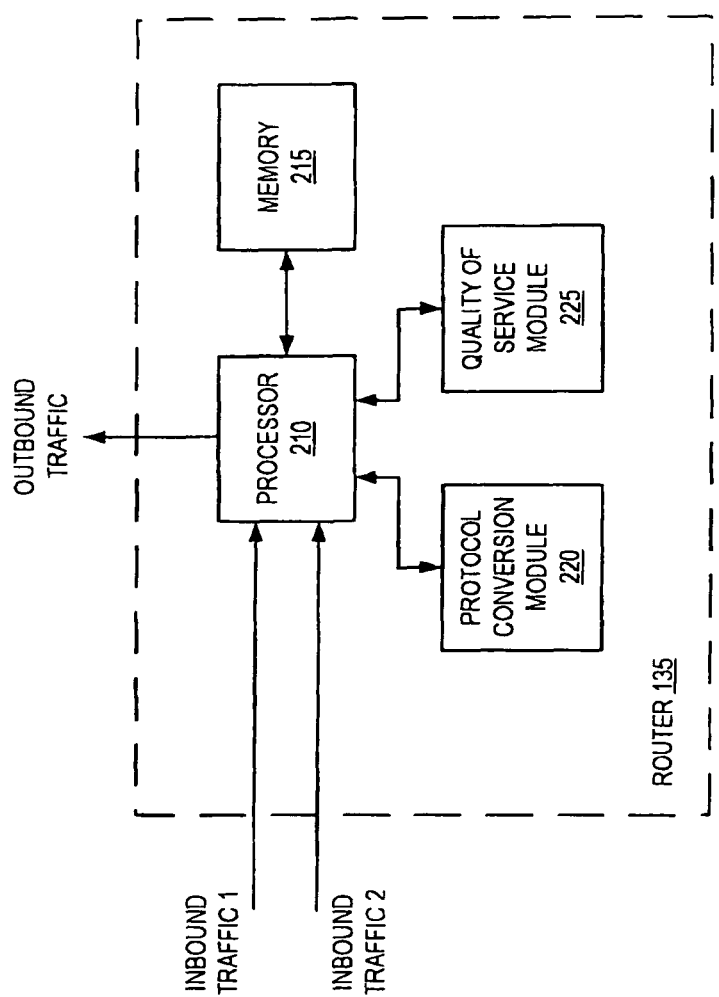
FIG. 2 is a block diagram of a router according to an embodiment of the present disclosure.

FIG. 2 is a block diagram of a router according to an embodiment of the present disclosure. The illustrated embodiment includes a processor 210, a memory 215, a protocol conversion module 220, and a quality of service module 225. The router 135 receives one or more inbound traffic channels and provides one or more outbound traffic channels. In the illustrated configuration, the processor 210 receives a first and a second inbound traffic channel and generates an outbound traffic channel that combines the first and the second traffic channels. The outbound traffic channel may be coupled to the network 170.

The processor 210 is coupled to each of the memory 215, the protocol conversion module 220, and the quality of service module 225. The processor 210 receives the first inbound traffic channel and assigns a priority to the data packets transported therein. For example, the first inbound traffic channel may represent merchant-generated traffic from the corporate infrastructure. This data may have a higher priority than customer-generated data. Higher priority may refer to data throughput speed as well as latency. More specifically, the preexisting data communication link 137 may have a predetermined data transport capacity or bandwidth (e.g., 1.55 Mbps). More high priority packets can be placed onto the outbound traffic channel than low priority packets to ensure that the higher priority packets achieve the desired transmission speed or latency requirements.

The quality of service module 225 is used to assign packet priorities. In one embodiment, packet priorities are assigned based on the traffic channel on which the packets arrived. Packet priorities may also be assigned based on other criteria, such as the application type. For example, credit card authorization data from the credit card processor 155 may be assigned the highest priority in order to ensure reliable and timely transmissions to and from the clearinghouse.

The memory 215 may include a routing table or other temporary data storage. In an embodiment, the memory 215 stores packets for inspection by the protocol conversion module 220 and the quality of service module 225.

The protocol conversion module 220 converts data packets from the inbound traffic channels into a format suitable for transport on the network 170. For example, the protocol conversion module 220 may encapsulate Ethernet or token ring frames into Internet protocol packets.

C. Wireless Access Method

Figure 3:
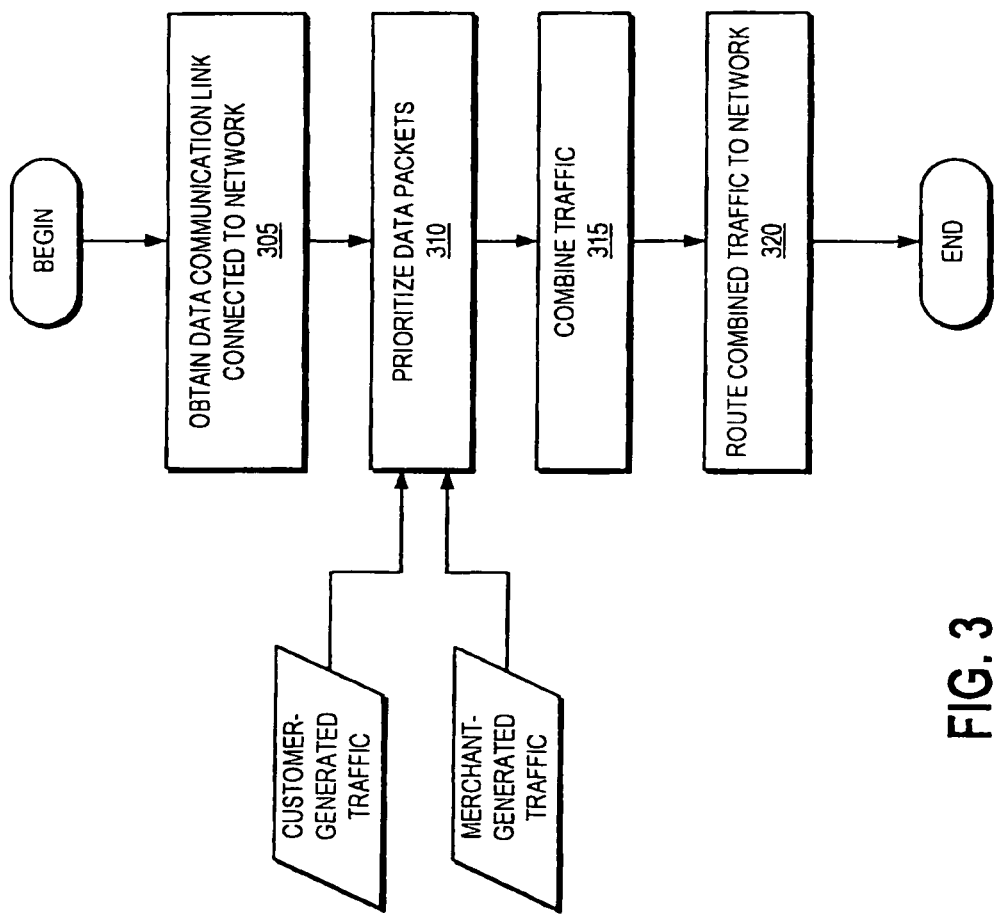
FIG. 3 illustrates a method for providing wireless access according to an embodiment of the present disclosure.

FIG. 3 illustrates a method for providing wireless access according to an embodiment of the present disclosure. The illustrated method begins with obtaining 305 a data communication link that is connected to a network. The data communication link may be a data connection that is preexisting at the merchant site 100. Example preexisting data communication links include those used for corporate communications, such as electronic mail and credit card transaction processing.

The method then prioritizes 310 customer-generated data and merchant-generated data. The customer-generated data includes the traffic flowing though the access point 120. The merchant-generated data includes the traffic flowing from the business network 150 and the credit card processor 155.

The method combines 315 the merchant- and customer-generated data flows in an output data flow that can be transported on the preexisting data communication link 137. The combined traffic is routed 320 to the network 170.

D. Portal Web Page

Figure 4:
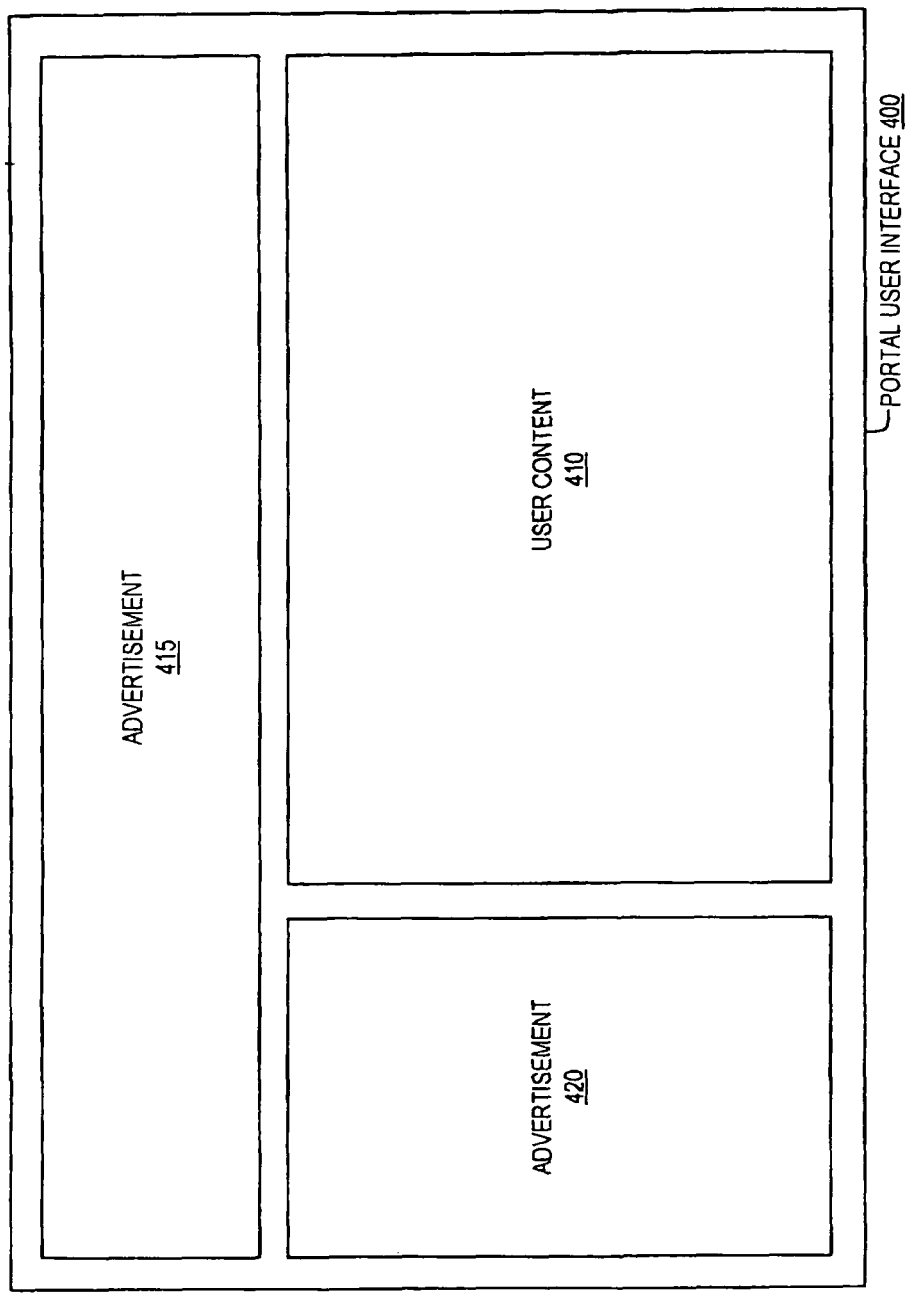
FIG. 4 illustrates a portal user interface including advertising content according to an embodiment of the present disclosure.

FIG. 4 illustrates a portal user interface including advertising content according to an embodiment of the present disclosure. The illustrated embodiment includes a portal user interface 400. The portal user interface 400 includes one or more display frames for user content 410, a first advertisement 415, and a second advertisement 420.

The advertisements 415, 420 may include promotional items, news, search functions, or other topical content. In one embodiment, the advertisements 415, 420 are bitmap images that are retrieved from the content server 180. The content server 180 may provide different advertisements using various selection strategies, such as elapsed time, scheduled time, and host location. The merchant may also influence the advertisement selections.

The advertisements 415, 420 may be arranged in any suitable configuration on the portal user interface 400. For example, variations may be made in the dimensions of the advertisements 415, 420 and the number of advertisements displayed. More specifically, with reference to the illustrated embodiment, the second advertisement 420 may extend substantially from the top to the bottom of the portal user interface 400 with a fixed or variable width. The dimensions or number of advertisements may be further dependent on the resolution or size of the display screen. For example, the width or height of the advertisements 415, 420 may be varied such that the user content 410 occupies a proportional amount (e.g. 70%) of the area of the portal user interface 400.

In one embodiment, the gateway 125 is responsible for inserting the advertisements 415, 420 into the portal user interface 400. The gateway 125 may insert merchant-generated advertisements (e.g.; current promotions) or request specific or general content from the content server 180.

User content 410 displays the customer-generated traffic. That is, the user content 410 displays the Internet web site or other information that the user is accessing from the network 170. The advertisements 415, 420 may be content-sensitive and relate to the content that the user is requesting from the network 170.

Having described embodiments of wireless access using preexisting data connection (which are intended to be illustrative and not limiting), it is noted that modifications and variations can be made by persons skilled in the art in light of the above teachings. It is therefore to be understood that changes may be made in the particular embodiments disclosed that are within the scope and spirit of the invention as defined by the appended claims and equivalents.

What is claimed is:

1. A method implemented on at least one computing device each of which has one or more processors, storage, and communication platform connected to a network for providing network access to a customer at a place of business operated by a merchant, comprising:

setting up a data communication link between the merchant and a wide area network to provide a service having a subscribed data transport capacity dedicated to the merchant at the place of business;

facilitating a customer of the merchant present at the place of business to utilize the dedicated service for the merchant to access, via a network access point installed at the place of business, the Internet via the data communication link;

integrating, by a router coupled to the merchant and the network access point, a first data traffic, received from the merchant, and a second data traffic, received from the customer via the network access point, to generate an integrated outgoing data traffic;

receiving, at the router, the first data traffic from the merchant;

receiving, at the router via the network access point, the second data traffic from the customer, where the first data traffic is independent of the second data traffic and the second data traffic includes data from the customer for desired content from the Internet;

assigning the first data traffic and the second data traffic with a corresponding priority based on whether data traffic is from the merchant or the customer;

combining, by the router, both the first and second data traffic to generate the integrated outgoing data traffic that is in compliant with the subscribed data transport capacity;

transmitting the integrated outgoing data traffic to the wide area network through the data communication link;

receiving, by the router, from the wide area network via the data communication link, incoming data traffic;

forwarding, by the router, a third data traffic, if present in the incoming data traffic and intended for the merchant, to the merchant; and forwarding, by the router, a fourth data traffic, is present in the incoming data traffic and intended for the customer, to the customer via the network access point and the fourth data traffic includes the desired content for the customer, wherein the customer and the merchant share the subscribed data transport capacity of the data communication link initially intended for the dedicated use of the merchant.

2. The method of claim 1, further comprising:
requesting commercial advertising content based on the second data traffic via the data communication link for the customer; and displaying the commercial advertising data to the customer.

3. The method of claim 2, wherein the displaying further comprises: arranging the advertising content on a portal user interface in accordance with some pre-determined criteria.

4. The method according to claim 1, further comprising:
transferring, through a first firewall, the first data traffic created behind the first firewall by the merchant, to the router via a merchant local network, wherein
the first firewall protects the merchant local network and the first data traffic.

5. The method of claim 4, further comprising: receiving the first data traffic from a merchant sub-network; and handling the first data traffic in a manner so as to prevent customer intrusion into the merchant sub-network.

6. The method of claim 1, further comprising:
designating a first priority to the first data traffic; and designating a second priority to the second data traffic.

7. The method of claim 6, wherein the first priority corresponds to greater data throughput than the second priority.

8. The method of claim 1, wherein the first data traffic includes credit card authorization transactions.

9. The method according to claim 4, wherein a device operated by the customer is behind a second firewall in a customer local network and the desired content is forwarded to the customer via the customer local network behind the second firewall.

10. The method according to claim 1, further comprising:
denying access to the Internet via the data communication link to a customer who has not been provided an access credential issued by the merchant.

11. The method according to claim 1, further comprising: requesting commercial advertising data based on the customer desired content.

12. The method according to claim 1, further comprising:
selecting commercial advertising data based on an amount of time the customer has been using the data communication link.

13. A system for providing network access to a customer at a place of business, operated by a merchant having dedicated service via a wide area network, the system comprising:

a data communication link configured between a merchant and the wide area network to provide the dedicated service, having a subscribed data transport capacity, to the merchant at a place of business operated by the merchant;

a network access point installed at the place of business configured to facilitate a customer of the merchant present at the place of business to utilize the dedicated service for the merchant to access the Internet via the data communication link;

a router, coupled to the merchant and the network access point, configured to integrate a first data traffic received from the merchant and a second data traffic received from the customer to generate an integrated outgoing data traffic wherein the router is programmed to:

receive the first data traffic from the merchant, receive, via the network access point, the second data traffic from the customer, where the first data traffic is independent of the second data traffic and the second data traffic includes data from the customer for desired content from the Internet, assign the first data traffic and the second data traffic with a corresponding priority based on whether data traffic is from the merchant or the customer, combine the first and second data traffic to generate the integrated outgoing data traffic that is in compliant with the subscribed data transport capacity, transmit the integrated outgoing data traffic to the wide area network through the data communication link, receive, via the data communication link, an incoming data traffic, forward a third data traffic, if present in the incoming data traffic and intended for the merchant, to the merchant, forward a fourth data traffic, if present in the incoming data traffic and intended for the customer, to the customer via the network access point, where the fourth data traffic includes the desired content for the customer, wherein the customer and the merchant share the subscribed data transport capacity of the data communication link initially intended for the dedicated use of the merchant.

14. The system of claim 13, wherein the router is further configured to adjust the designation of traffic generated by the customer device and traffic generated by the merchant device according to data priority.

15. The system of claim 13, wherein:
the place of business operated by the merchant comprises a credit card processor coupled to the wide area network and configured to carry out credit card authorization transactions.

16. The system of claim 13, wherein the second data traffic generated by the customer is communicated in a first data communication protocol and the first data traffic generated by the merchant is communicated in a second data communication protocol.

17. The system of claim 16, wherein the router includes a protocol conversion module configured to convert the first and the second data communication protocols for transmission on the internet.

18. The system according to claim 13, further comprising:
a gateway configured to request commercial advertising data based on content contained in the second data traffic.

19. The system according to claim 18, wherein
the gateway is further configured to select commercial advertising data based on an amount of time the customer has been using the network access point.

20. The method of claim 1, wherein
the user is not charged a fee for use of the service dedicated to the merchant.

21. The method of claim 11, further comprising:
blending, by the router, the customer desired content with the commercial data to produce blended content data to be displayed to the customer.

22. The system of claim 19, wherein
the commercial advertising data is blended with the customer desired content to produce blended content data to be displayed to the customer.

23. The method of claim 1, wherein
the customer communicates with the network access point via a wireless networking link; and the customer desired content is a web page.

24. The system of claim 13, wherein the customer communicates with the network access point via a wireless networking link;
and the customer desired content is a web page.

25. The method of claim 1, wherein the network access point is separate from the router and is accessible only by the customer.

26. A method implemented on at least one computing device each of which has one or more processors, storage, and communication platform connected to a network for providing network access to a customer at a place of business operated by a merchant, comprising:
setting up a data communication link between the merchant and a wide area network to provide a service having a subscribed data transport capacity dedicated to the merchant at the place of business;
facilitating a customer of the merchant present at the place of business to utilize the dedicated service for the merchant by providing a network access point that is separate from a router and installed at the place of business to allow the customer to access the Internet via the data communication link, wherein the network access point is accessible only by the customer;
integrating, by a router coupled to the merchant and the network access point, a first data traffic, received from the merchant, and a second data traffic, received from the customer via the network access point, to generate an integrated outgoing data traffic;
receiving, at the router, the first data traffic from the merchant;
receiving, at the router from the network access point, the second data traffic from the customer, where the first data traffic is independent of the second data traffic and the second data traffic includes data from the customer for desired content from the Internet;
assigning, by the router, the first data traffic and the second data traffic with a corresponding priority based on whether data traffic is from the merchant or the customer;
combining, by the router, both the first and second data traffic to generate the integrated outgoing data traffic that is in compliant with the subscribed data transport capacity;
transmitting the integrated outgoing data traffic to the wide area network through the data communication link;
receiving, by the router, from the wide area network via the data communication link, incoming data traffic;
forwarding, by the router, a third data traffic, if present in the incoming data traffic and intended for the merchant, to the merchant; and
forwarding, by the router, a fourth data traffic, is present in the incoming data traffic and intended for the customer, to the customer via the network access point and the fourth data traffic includes the desired content for the customer, wherein
the customer and the merchant share the subscribed data transport capacity of the data communication link initially intended for the dedicated use of the merchant.

* * * * *

UNITED STATES PATENT AND TRADEMARK OFFICE
CERTIFICATE OF CORRECTION

| | | |
|---|---|---|
| PATENT NO. | : 8,818,913 B1 | Page 1 of 1 |
| APPLICATION NO. | : 10/756261 | |
| DATED | : August 26, 2014 | |
| INVENTOR(S) | : Steven C. Meyer et al. | |

It is certified that error appears in the above-identified patent and that said Letters Patent is hereby corrected as shown below:

Title Page

"item (75)" should read -- item (76) --

Please delete the Assignee Information as follows:

"(73) Assignee: Junkin Holdings LLC, Corona del Mar, CA (US)"

Signed and Sealed this
Fifteenth Day of September, 2015

Michelle K. Lee
*Director of the United States Patent and Trademark Office*